United States Patent
Rifici

(10) Patent No.: US 10,173,661 B2
(45) Date of Patent: Jan. 8, 2019

(54) BRAKE FADE MANAGEMENT SYSTEM FOR A BRAKE-BY-WIRE SYSTEM

(71) Applicant: GM Global Technology Operations LLC, Detroit, MI (US)

(72) Inventor: Anthony J. Rifici, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 78 days.

(21) Appl. No.: 15/359,989

(22) Filed: Nov. 23, 2016

(65) Prior Publication Data

US 2018/0141533 A1  May 24, 2018

(51) Int. Cl.
*B60T 17/22* (2006.01)
*B60T 7/04* (2006.01)

(52) U.S. Cl.
CPC ............ *B60T 17/221* (2013.01); *B60T 7/042* (2013.01); *B60T 2270/82* (2013.01)

(58) Field of Classification Search
CPC .................................................. B60T 17/221
See application file for complete search history.

(56) References Cited

U.S. PATENT DOCUMENTS

2018/0079403 A1\* 3/2018 Masuda ................ B60T 17/221

\* cited by examiner

*Primary Examiner* — Adam D Tissot
*Assistant Examiner* — Michael A Berns
(74) *Attorney, Agent, or Firm* — Cantor Colburn LLP

(57) ABSTRACT

A brake-by-wire system includes an actuator to initiate a brake for decelerating a vehicle. A brake fade management system of the brake-by-wire system includes an actuator target arbitrator module, a compliance module, and an output loss module. The compliance module calculates and delivers displacement adjusted actuator target data to the actuator target arbitrator module. The output loss module calculates and delivers output adjusted actuator target data to the actuator target arbitrator module. The actuator target arbitrator module processes the displacement adjusted actuator target data and the output adjusted actuator target data, and outputs an actuator target command signal to the actuator.

18 Claims, 4 Drawing Sheets

BRAKE FADE MANAGEMENT SYSTEM FOR A BRAKE-BY-WIRE SYSTEM

The subject invention relates to a vehicle brake-by-wire (BBW) system, and more particularly, to a brake fade management system for a BBW system.

Traditional service braking systems of a vehicle are typically hydraulic fluid based systems actuated by an operator depressing a brake pedal that generally actuates a master cylinder. In-turn, the master cylinder pressurizes hydraulic fluid in a series of hydraulic fluid lines routed to respective actuators at brakes located adjacent to each wheel of the vehicle. Such hydraulic braking may be supplemented by a hydraulic modulator assembly that facilitates anti-lock braking, traction control, and vehicle stability augmentation features. The wheel brakes may be primarily operated by the manually-actuated master cylinder with supplemental actuation pressure gradients supplied by the hydraulic modulator assembly during anti-lock, traction control, and stability enhancement modes of operation.

When a plunger of the master cylinder is depressed by the brake pedal to actuate the wheel brakes, pedal resistance is encountered by the operator. This resistance may be due to a combination of actual braking forces at the wheels, hydraulic fluid pressure, mechanical resistance within the booster/master cylinder, the force of a return spring acting on the brake pedal, and other factors. Consequently, a operator is accustomed to, and expects to 'feel', this resistance as a normal occurrence during operation of the vehicle.

More recent advancements in braking systems include BBW systems that actuate the vehicle brakes via an electric signal typically generated by an on-board controller. Brake torque may be applied to the wheel brakes without a direct hydraulic link to the brake pedal. The BBW system may be an add-on, (i.e., and/or replace a portion of the more conventional hydraulic brake systems), or may completely replace the hydraulic brake system (i.e., a pure BBW system). In either type of BBW system, the brake pedal 'feel', which an operator is accustomed to, may be emulated.

One manageable factor of any variety of brake system may be known as brake fade. Brake fade is generally the decrease in braking efficiency caused by the overheating of brake pads. During a brake fade scenario of a vehicle, a partial loss of deceleration gain accompanied by an increase in brake pedal travel to compensate (i.e., beyond normal use travel) may occur. The design of the brake pedal for traditional hydraulic systems and the design of emulating brake pedal devices for BBW systems should thereby include a total achievable brake pedal stroke that not only includes pedal displacement associated for normal braking operation, but also additional pedal displacement for brake fade conditions. This additional pedal displacement, or travel, is at least in-part desirable due to the combined effects of loss in output (i.e., loss of brake torque for a given hydraulic pressure) and increases in compliance such as a deficiency in hydraulic fluid volume to maintain a targeted hydraulic fluid pressure.

In more traditional hydraulic and/or vacuum based braking systems, brake fade may be managed by an operator via the 'feel' or direct feedback to the operator through the brake pedal. That is, for traditional brake systems, the operator may gain information about brake fade by experiencing a change in the pedal force, travel and deceleration relationships. Based on this brake pedal feedback, the operator may have the ability to compensate directly by applying more force and adjusting to a longer brake pedal travel up to the pedal's capability. For traditional hydraulic brake systems, the pedal travel held in reserve for degraded braking may be large as a proportion of overall pedal force and travel limits. In contrast, for BBW systems, the brake pedal displacement reserve available to an operator may be minimal, particularly when considering operation with a loaded vehicle in combination with brake fade. That is, when a vehicle is loaded, as oppose to unloaded, the vehicle requires greater hydraulic pressure for a given deceleration. To achieve higher hydraulic pressures, more pedal travel is generally required. For BBW systems, the effects of brake fade may manifest itself differently to the operator than in traditional systems, however brake fade would still present as a loss of output and/or an increase in compliance.

The 'loss of output' is associated with the additional pedal force or pressure and associated travel needed to decelerate the vehicle. That is, the operator may push deeper into the pedal stroke to command a higher pressure at the brake. Moreover, the force applied to the brake pedal may be fixed along the pedal stroke (i.e., same applied pressure regardless of brake pedal position), so the brake pedal 'feel' remains firm throughout the brake pedal stroke. The operator may continue pushing deeper into the stroke until the end of brake pedal travel is reached, where maximum pressure may be commanded at the brake. In some BBW systems, any brake pedal travel held in reserve may unfortunately be unavailable or limited to manage brake fade when the vehicle is generally unloaded and generally even more limited when the vehicle is loaded.

The 'increase in compliance' is associated with an increase in volume or displacement on the actuator side of a BBW system (i.e., does not relate to brake pedal displacement or stroke in some BBW systems). Such an increase in compliance may lead to brake delays and input/output phasing issues. For BBW systems that are closed loop around pressure (i.e., hydraulic pressure changes based on brake pedal position), the BBW system may compensate for an increase in compliance to a degree, however that capability may be limited.

In one example, the isolation between the brakes and the brake pedal of a BBW system changes the manner in which the operator experiences brake fade and limits the ability of the operator to manage fade purely by feedback through the brake pedal, as would be the case for a more traditional, hydraulic, braking system. Accordingly, it is desirable to provide a brake fade management system capable of managing and/or assisting an operator in managing brake fade for BBW systems while minimizing the necessary total pedal stroke displacement.

SUMMARY

In one exemplary embodiment of the present disclosure, a brake-by-wire system includes an actuator adapted to initiate a brake for decelerating a vehicle. A brake fade management system of the brake-by-wire system includes an actuator target arbitrator module, a compliance module, and an output loss module. The compliance module calculates and delivers displacement adjusted actuator target data to the actuator target arbitrator module. The output loss module calculates and delivers output adjusted actuator target data to the actuator target arbitrator module. The actuator target arbitrator module processes the displacement adjusted actuator target data and the output adjusted actuator target data, and outputs an actuator target command signal to the actuator.

In another embodiment, a computer program product for calculating and outputting an actuator target command to a brake actuator of a brake-by-wire system includes an actuator target arbitrator module, a compliance module, and an output loss module. The compliance module calculates and delivers displacement adjusted actuator target data to the actuator target arbitrator module. The output loss module calculates and delivers output adjusted actuator target data to the actuator target arbitrator module. The actuator target arbitrator module processes the displacement adjusted actuator target data and the output adjusted actuator target data to calculate the actuator target command.

The above features and advantages and other features and advantages of the disclosure are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
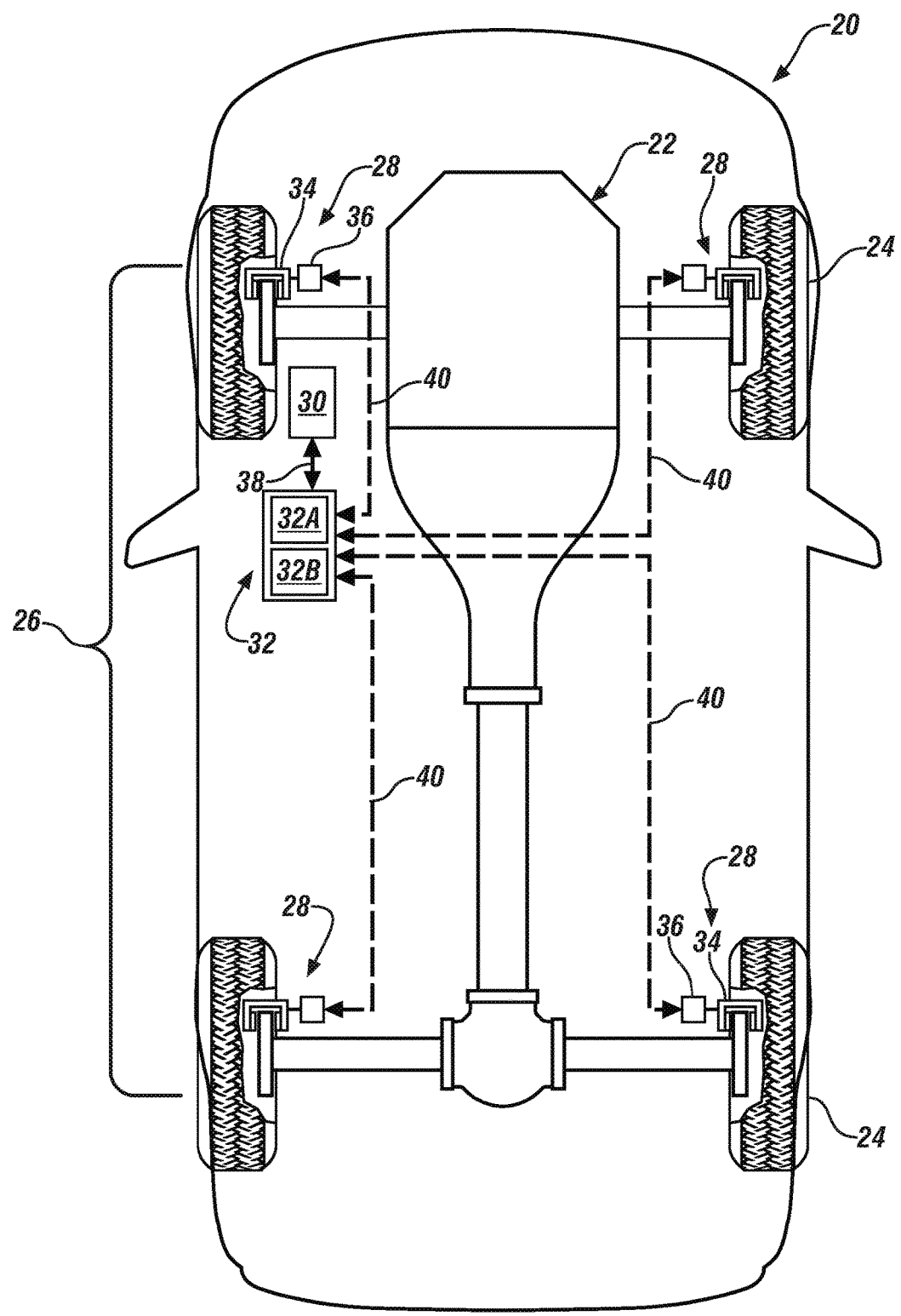
FIG. 1 is a schematic of a vehicle utilizing a BBW system that includes a brake fade management system as one non-limiting example in accordance with the present disclosure.

The following description is merely exemplary in nature and is not intended to limit the present disclosure, its application or uses. It should be understood that throughout the drawings, corresponding reference numerals indicate like or corresponding parts and features. As used herein, the terms module and controller refer to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Referring to FIG. 1, a non-limiting, exemplary, embodiment of a vehicle 20 is illustrated. The vehicle 20 may include a powertrain 22 (i.e., an engine, transmission and differential), a plurality of rotating wheels 24 (i.e., four illustrated), and a BBW system 26. The powertrain 22 is adapted to drive at least one of the wheels 24 thereby propelling the vehicle 20 upon a surface (e.g., road). The BBW system 26 is configured to generally slow the speed and/or stop motion of the vehicle 20, and may include a brake assembly 28 for each respective wheel 24, a brake pedal device 30, and a controller 32. The vehicle 20 may be a racing vehicle, and/or may be an automobile, truck, van, sport utility vehicle, or any other self-propelled or towed conveyance suitable for transporting a burden.

Figure 2:
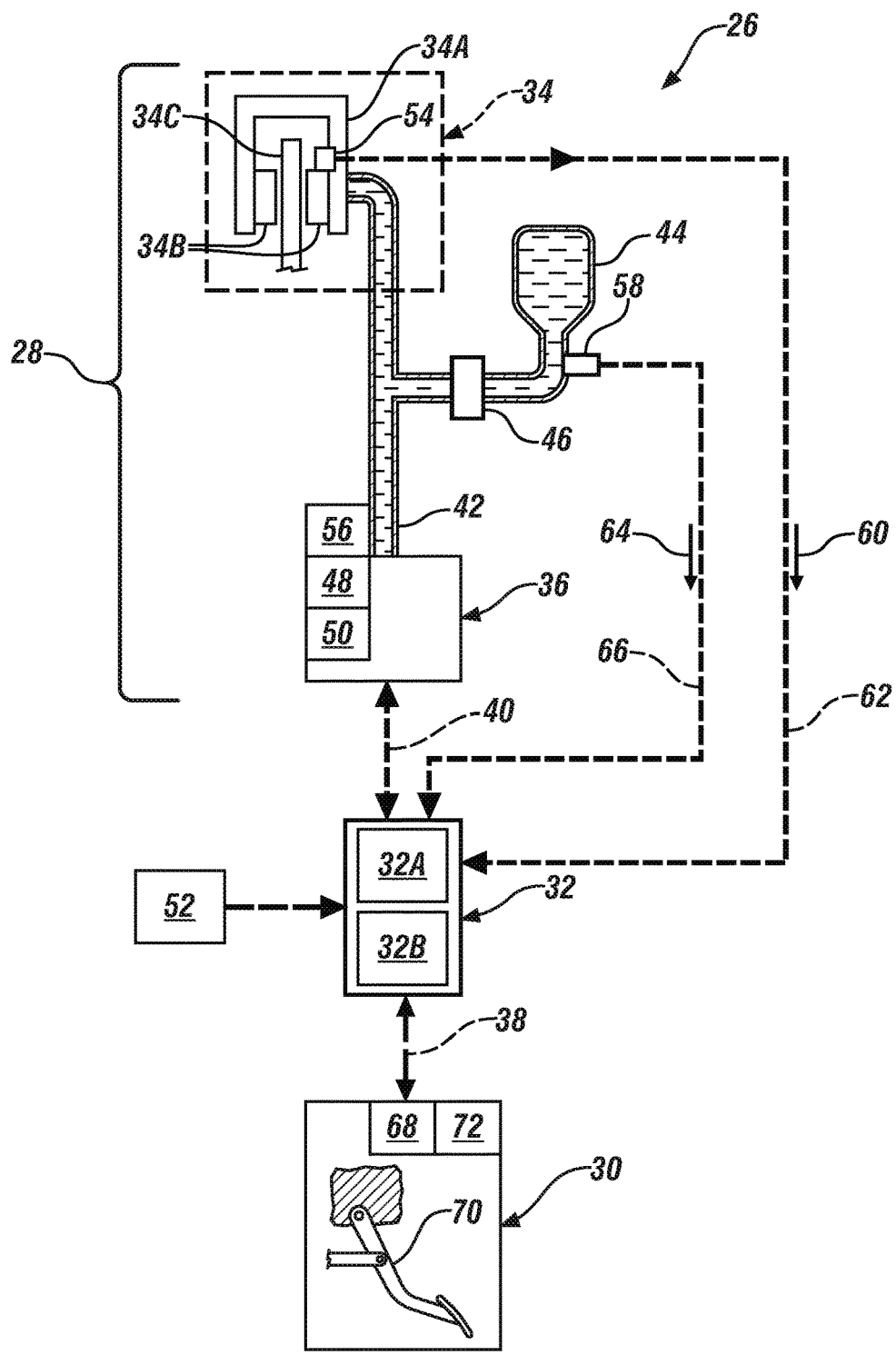
FIG. 2 is a schematic of the BBW system.
Figure 3:
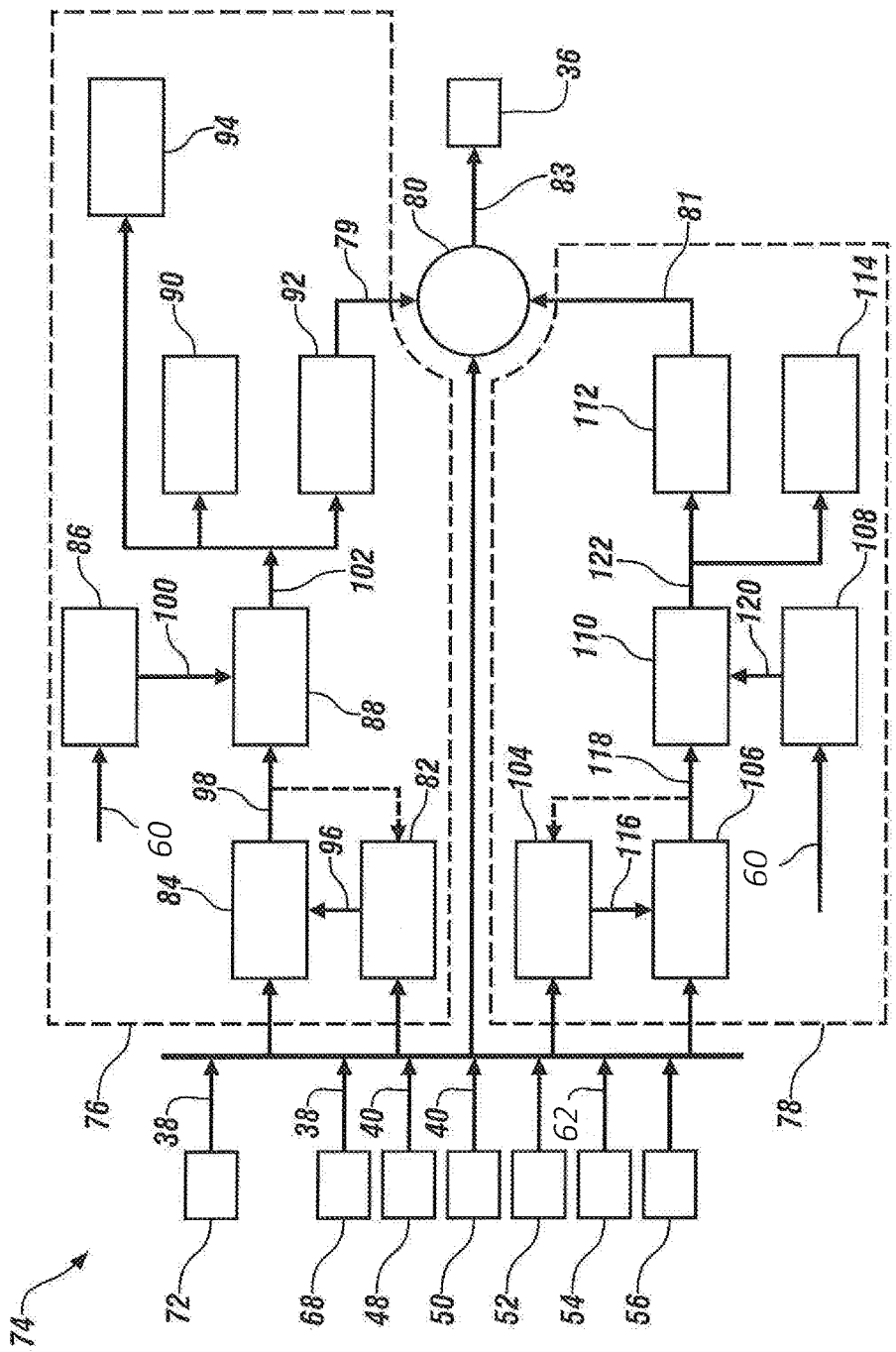
FIG. 3 is a flow chart illustrating the brake fade management system.

Referring to FIGS. 2 and 3, with continuing reference to FIG. 1, each brake assembly 28 of the BBW system 26 may include a brake 34 and an actuator 36 configured to operate the brake. In one example, the brake 34 may include a caliper 34A, opposing brake pads 34B, and a rotating brake disc 34C. Although illustrated as a disc brake, the brake 34 may be any type of brake including a drum brake, and others. As non-limiting examples, the actuator 36 may be an electro-hydraulic brake actuator (EHBA) or other actuator capable of actuating the brake 34 based on an electrical input signal that may be received from the controller 32. More specifically, the actuator 36 may be, or may include, any type of motor capable of acting upon a received electric signal, and as a consequence, converting energy into motion that controls movement of the brake 34. Thus, the actuator 36 may be a direct current motor configured to generate electro-hydraulic pressure delivered to, for example, the calipers of the brake 34.

Referring to FIG. 2 and in one example, the brake assembly 28 may further include at least one hydraulic line 42 and a hydraulic fluid reservoir 44. The hydraulic line 42 provides fluid communication between the actuator 36 and the caliper 34A. The actuator 36 may be configured to increase pressure in the hydraulic line 42 to actuate the brake 34 thereby decelerating the vehicle 20. The fluid reservoir 44 adds fluid to the hydraulic line 42 to maintain hydraulic pressure. Control of hydraulic fluid makeup may be achieved via a pressure control device 46 disposed generally between, and in communication between the hydraulic fluid line 42 and the reservoir 44. Depending upon operating conditions, the pressure control device 46 may be constructed to flow in either direction. It is further contemplated and understood that the brake assembly 28 may be a closed loop pressure system, may include multiple actuators 36, and may include multiple hydraulic lines 42 in any number of configurations as is known to one having skill in the art.

The BBW system 26 may further include a multitude of sensors 48, 50, 52, 54, 56, 58 that may be in communication with the controller 32. The sensor 48 may be part of the actuator 36 and may sense actuator position. The sensor 50 may be part of the actuator 36 and may sense actuator apply rate or speed. The sensor 52 may be positioned in any variety of locations on the vehicle 20 and may measure vehicle deceleration as is known to one having skill in the art. The sensor 54 may be part of the brake 34 and may measure temperature of the brake pad 34B. The temperature sensor 54 may output an electric signal (see arrow 60) indicative of temperature, and over pathway 62, to the controller 32. It is contemplated and understood that the temperature sensor 54 may generally be replaced with a computer readable model based on any variety of factors that may include the vehicle deceleration, time, vehicle speed, magnitude of brake pedal applied pressure, magnitude of hydraulic pressure, brake pedal position, and/or other factors.

The sensor 56 may be generally mounted to the hydraulic line 42 and may measure hydraulic fluid pressure. The sensor 58 may be a displacement sensor. One example of a displacement sensor 58 may be a volumetric sensor used to measure the volume of hydraulic fluid exiting and entering the fluid reservoir 44. The volumetric sensor 58 may further output an electric signal (see arrow 64) indicative of fluid volume, or volume flow rate, over pathway 66 and to the controller 32. In another example where the brake assembly 28 may be mechanical and does not use hydraulic fluid, the displacement sensor 58 may be proximate to the actuator 36 and may measure, for example, axial displacement of a worm gear used to apply a pressure directly to the caliper 34A, or rotation of a stepper motor. Further sensors of the BBW system 26 may be part of the brake emulator 30 and may include a position sensor 68 that may measure the position of a brake pedal 70 along its stroke path, and may further include a speed or stroke rate sensor 72 that may measure the rate upon which an operator depresses the brake pedal 70.

The controller 32 may include a computer-based processor 32A (e.g., microprocessor) and a computer readable and writeable storage medium 32B. In operation, the controller 32 may receive one or more electrical signals from the sensors 68, 72 of the brake emulator 30 over a pathway (see arrow 38) indicative of operator braking intent. In-turn, the controller 32 may process such signals, and based at least in-part on those signals, output an electrical command signal to the actuators 36 over a pathway (see arrow 40). The pathways 38, 40, 62, 66 may be wired pathways, wireless pathways, or a combination of both. Non-limiting examples of the controller 32 may include an arithmetic logic unit that performs arithmetic and logical operations; an electronic control unit that extracts, decodes, and executes instructions from a memory; and, an array unit that utilizes multiple parallel computing elements. Other examples of the controller 32 may include an engine control module, and an application specific integrated circuit. It is further contemplated and understood that the controller 32 may include redundant controllers, and/or the system may include other redundancies, to improve reliability of the BBW system 26.

Referring to FIG. 3, a brake fade management system 74 of the BBW system 26 functions to identify braking conditions under which to engage, disengage, or sensitize a set of features to manage brake fade. The brake fade management system 74 may also function to establish a long-term brake compliance compensation to mitigate the effects of compliance (i.e., meaning a deficiency in hydraulic fluid volume and/or an increase in required, mechanical displacement) on the driving experience or feel, and sensitivity to false diagnostic action. The brake fade management system 74 may be, or may include, a computer program product that may be stored in the storage medium 32B and executed by the processor 32A of the controller 32. The brake fade management system 74 may be part of a control module and/or may be, or may be part of, one or more Application Specific Integrated Circuit(s) (ASIC), electronic circuit(s), central processing unit(s) (e.g., microprocessor and associated memory and storage) executing one or more software or firmware programs and routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators and other devices.

The brake fade management system 74 is configured to facilitate numerous attributes with regard to brake fade. Such attributes may include extended pedal feel, active long-term compliance compensation, active long-term output compensation, warning generation, and mitigation actuation. The extended pedal feel attribute is associated with adding a rate to a brake pedal emulation design intended to stiffen the brake pedal beyond normal driving to increase the pedal force needed to reach end of brake pedal stroke and provide a greater force differential to handle brake fade.

The active long-term compliance compensation attribute generally evaluates pressure relative to a target pressure and an apply rate, to establish any pressure deviation or error. If a pressure error is determined, this attribute may adjust for a consistent increase in volume or displacement needed to achieve the targeted pressure, and/or achieve a consistent observed delay in achieving the pressure target. Such adjustments may be achieved by speeding up a motor proactively early in the stroking of the brake pedal. This attribute may also reset or extend diagnostic thresholds. The active long-term compliance compensation attribute may be enabled, disabled, sensitized, desensitized by a brake temperature model (see FIG. 4), which may be accessed and stored in the storage medium 32B.

The active long-term output compensation attribute may generally be closed loop around deceleration and may alter the brake pedal stroke and target pressure relationship to compensate for a reduction in brake output. This attribute may be enabled, disabled, sensitized, and/or desensitized based on actual brake pad temperature or a brake temperature model.

The warning generation attribute is a means of notifying an operator that the brake system is reaching pre-established limits, or a threshold. Such means of notification may include a Driver Information Center (DIC) display message, or may be an alteration of the brake pedal 'feel'. Examples of a brake pedal feel alteration may include changing calibration parameters, implementing a pulsation through the brake pedal, a stutter, and others that may be felt. The mitigation actuation attribute may generally occur when an operator fails to take heed of the warning generation attribute. The mitigation actuation attribute may entail limiting the speed of the vehicle and/or reducing engine power.

The brake fade management system 74 may include a compliance module 76, an output loss module 78, and an actuator target arbitrator module 80. The compliance module 76 is associated with the evaluation and compensation of a displacement error (i.e., displacement makeup). In one example, the displacement error may be a volume error indicative of a need for an additional volume of hydraulic fluid to maintain hydraulic fluid pressure in a closed loop type of hydraulic pressure system. The output loss module 78 is associated with the evaluation and compensation of a loss in brake torque with a given hydraulic pressure. The compliance module 76 is configured to calculate and deliver volume adjusted actuator target data (see arrow 79) to the actuator target arbitrator module 80, and the output loss module 78 is configured to calculate and deliver output adjusted actuator target data (see arrow 81) to the actuator target arbitrator module 80. The module 80 is configured to process data 79, 81 and output an actuator target command signal (see arrow 83) to the actuator 36. The actuator target may be the command for the actuator that generates, for example, hydraulic pressure, The command may be a position and a rate to achieve the position, or a motor speed and a pressure stop point. The modules 76, 78, 80 may be software based, or a combination of software and hardware components.

The compliance module 76 may include the following sub-modules or routines: a displacement error routine 82, a displacement trend routine 84, a displacement threshold routine 86, a displacement intervention level routine 88, a displacement diagnostic threshold routine 90, a displacement actuator target routine 92, and a warning and/or mitigation routine 94. The displacement error routine 82 may be configured to calculate, for example, displacement or volume error data (see arrow 96), which may represent the additional volume of hydraulic fluid needed to compensate for a loss in hydraulic fluid pressure. The calculation may be based on a volume verse pressure/time lookup table, or may be based on longer-term learned values.

The displacement error routine 82 sends the calculated displacement error data 96 to the displacement trend routine 84. The trend routine 84 applies at least the displacement error data 96 to establish long-term volume error data 98 that is sent to the intervention level routine 88. The displacement threshold routine 86 receives the real-time brake pad temperature signal or data 60 from temperature sensor 54, and via use of the temperature calibration table, determines a displacement or volume error threshold data (see arrow 100). The volume error threshold data 100, along with the long-term volume error data 98, are sent to the intervention level routine 88 which uses this data to calculate intervention level data (i.e., volume error offset data, see arrow 102).

In one example, the intervention level data may be generally established in steps, as opposed to continuous. That is, a data table may include a series of intervention levels (e.g., four levels) with a series of corresponding volume offsets (e.g., four offsets). The actual, currently calculated, volume error may fall between the values in the tables. If this should occur, the system may choose to intervene at a fixed amount until the error crosses the next threshold. This embodiment may minimize processor calculation burden and may provide a greater degree of consistency to the operator. Operators may adapt with a bandwidth (i.e., between interventions), while the system generally tends to avoid a moving target. That is, the system may ratchet-up the level of intervention by fixed amounts.

The displacement or volume error offset data 102 calculated by the intervention level routine 88 may then be sent to the actuator target routine 92, the diagnostic threshold routine 90, and the warning routine 94. The actuator target routine 92 uses the volume error offset data 102 to establish the displacement or volume adjusted actuator target 79 that is sent to the arbitrator actuator target module 80 that facilitates a review of many actuator requests and determines which request is of highest priority and thus most important to follow. For example, automatic emergency braking for an imminent collision would be of a high priority. Another example may be the reduction of speed/duty cycle for thermal concerns. The diagnostic threshold routine 90 uses the displacement error offset data 102 to adjust diagnostic thresholds. The warning routine 94 may use the displacement error offset data 102 to warn the operator of brake system issues and/or mitigate problems by limiting vehicle performance in any variety of ways.

The output loss module 78 may include the following sub-modules or routines: an output error routine 104, an output trend routine 106, an output threshold routine 108, an output intervention level routine 110, an output adjusted actuator target routine 112, and a warning routine 114. The output error routine 104 may be configured to calculate, for example, output error data (see arrow 116), which may represent the additional brake pressure needed for a given deceleration due to brake fade. The calculation may be based on deceleration verse pressure and/or time lookup table, or may be based on longer-term learned values.

The output error routine 104 sends the calculated output error data 116 to the output trend routine 106. The trend routine 106 applies at least the output error data 116 to establish long-term output error data (see arrow 118) that is sent to the output intervention level routine 110. The output threshold routine 108 receives a real-time brake pad temperature signal or data 62 from temperature sensor 54, and via use of the temperature calibration table, determines output error threshold data (see arrow 120). The output error threshold data 120, along with the long-term volume error data 118, are sent to the output intervention level routine 110, which uses this data to calculate output intervention level data (i.e., output error offset data, see arrow 122).

The output error offset data 122 calculated by the output intervention level routine 110 may then be sent to the output adjusted actuator target routine 112, and the output warning routine 114. The output actuator target routine 112 uses the output error offset data 122 to establish the output adjusted actuator target data 81 that is sent to the arbitrator actuator target module 80. The warning routine 114 may use the output error offset data 122 to warn the operator of brake system issues and/or mitigate problems by limiting vehicle performance in any variety of ways.

Figure 4:
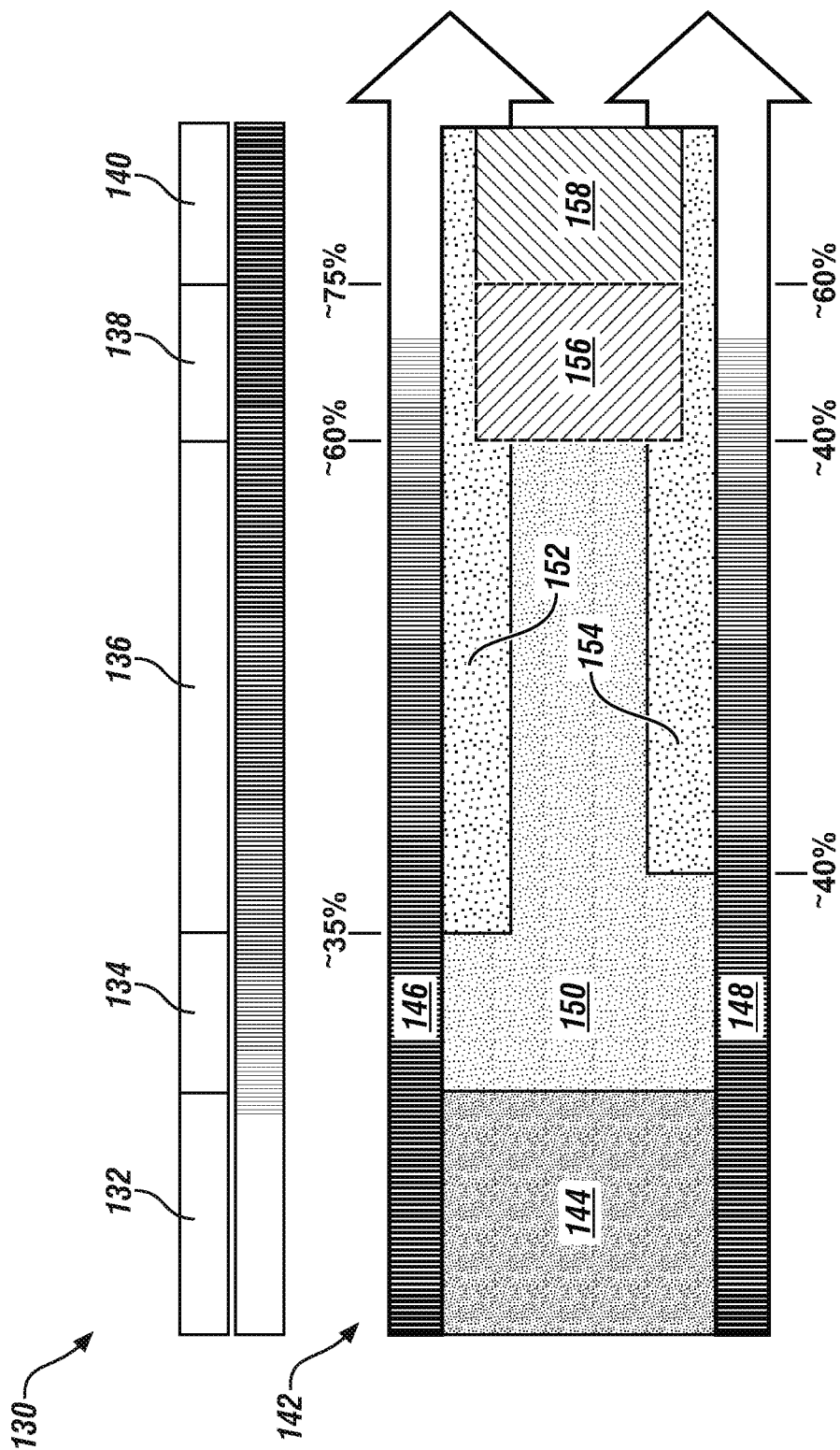
FIG. 4 is a flow chart illustrating coordination of long-term compliance and output loss compensation as a function of brake pedal travel.

Referring to FIG. 4, a flow chart generally illustrates the operation of a BBW system 26 having the brake fade management system 74. The upper bar chart 130 generally illustrates a brake pad thermal model where block 132 generally represents normal brake pad operating temperature(s), and blocks 134, 136, 138, 140 represent elevated brake pad temperatures that rise from left to right. The lower bar chart 142 generally illustrates various system events with increasing brake pedal travel/displacement (i.e., from left to right).

In operation, during stage one normal brake pad temperatures (see block 132) a vehicle operator may experience standard brake pedal feel (see area 144). Although the brake pedal feel may be standard, compliance may begin to increase (see area 146) and output may begin to decrease (see area 148). During stage two (see block 134) brake pad temperature may begin to exceed normal operation temperature as the brake pedal continues to travel. During block 134 the operator may be in an extended pedal feel (see area 150), however, the brake fade management system 74 may remain generally disabled and the operator thus desensitized to brake pad heating. In addition, and during block 134, the compliance 146 may continue to increase and the output 148 may continue to decrease.

As temperature elevates from left-to-right through block 136, the brake fade management system 74 may be enabled and the operator becomes sensitized through brake pedal feel indicating a potential brake fade event. In one example and with the brake pedal at a given position, active long term compliance compensation (see block 152) may begin. With continued travel of the brake pedal, but still within the block 136 temperature range, the active long-term output compensation (see block 154) may become active while the compliance 146 continues to increase and the output 148 continues to decrease.

As temperatures elevate through block 138 and the compliance 146 continues to increase and the output 148 continues to decrease, the brake fade management system 74 may initiate a warning (see block 156) via routines 94, 114. As temperatures elevate through block 140 and the compliance 146 continues to increase and the output 148 continues to decrease, the brake fade management system 74 may initiate a mitigation (see block 158) via routines 94, 114. Such mitigation may include a reduction in engine power and/or a forced reduction in vehicle speed.

The present disclosure may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosure is described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A brake fade management system of a brake-by-wire system including an actuator to initiate a brake for decelerating a vehicle, the brake fade management system comprising:

an actuator target arbitrator module;
a compliance module configured to receive a brake pad temperature signal from a temperature sensor to calculate and deliver displacement adjusted actuator target data to the actuator target arbitrator module, the compliance module including a displacement error routine configured to calculate displacement error data, and a displacement trend routine configured to receive the displacement error data for compilation and establishing long-term volume error data used to calculate the displacement adjusted actuator target data;
an output loss module configured to receive the brake pad temperature signal from the temperature sensor to calculate and deliver output adjusted actuator target data to the actuator target arbitrator module, wherein the actuator target arbitrator module processes the displacement adjusted actuator target data and the output adjusted actuator target data, and outputs an actuator target command signal to the actuator; and
a computer-based controller including one or more processors and one or more non-transitory storage mediums, wherein the actuator target arbitrator module, the compliance module, and the output loss module are part of a software program stored in the one or more non-transitory storage mediums and executed by the one or more processors.

2. The brake fade management system set forth in claim 1, wherein the compliance module includes a displacement threshold routine configured to receive the real-time brake pad temperature signal and calculate displacement error threshold data based on the brake pad temperature signal, and an intervention level routine to receive the long-term displacement error data and the displacement error threshold data to calculate displacement error offset data.

3. The brake fade management system set forth in claim 2, wherein the compliance module includes a displacement adjusted actuator target routine configured to receive the displacement error offset data and calculate the displacement adjusted actuator target data.

4. The brake fade management system set forth in claim 2, wherein the compliance module includes an adjust displacement diagnostic threshold routine configured to receive the displacement error offset data and adjust displacement diagnostic thresholds.

5. The brake fade management system set forth in claim 2, wherein the compliance module includes an initiate displacement warning routine configured to receive the displacement error offset data and initiate a brake warning.

6. The brake fade management system set forth in claim 2, wherein the compliance module includes an initiate displacement mitigation routine configured to receive the displacement error offset data and initiate a vehicle performance limitation.

7. The brake fade management system set forth in claim 6, wherein the output loss module includes output error routine to calculate output error data.

8. The brake fade management system set forth in claim 7, wherein the output loss module includes a long-term output trend routine to receive the output error data for compilation and establishing long-term output error data.

9. The brake fade management system set forth in claim 8, wherein the output loss module includes an output threshold routine to calculate output error threshold data based on the brake pad temperature signal, and an output intervention level routine to receive the long-term output error data and the output error threshold data to calculate output error offset data.

10. The brake fade management system set forth in claim 9, wherein the compliance module includes an output adjusted actuator target routine to receive the output error offset data and calculate the output adjusted actuator target data.

11. The brake fade management system set forth in claim 9, wherein the output loss module includes an initiate output warning routine configured to receive the output error offset data and to initiate a brake warning.

12. The brake fade management system set forth in claim 1, wherein the displacement adjusted actuator target data is based on at least long-term displacement error data and the brake pad temperature signal.

13. The brake fade management system set forth in claim 12, wherein the output adjusted actuator target data is based on long-term output error data and the brake pad temperature signal.

14. A computer program product for calculating and outputting an actuator target command to a brake actuator of a brake-by-wire system, the computer program product comprising:
an actuator target arbitrator module configured to calculate and output the actuator target command to effect operation of the brake actuator;
a compliance module configured to receive a brake pad temperature signal to calculate and deliver volume adjusted actuator target data indicative of hydraulic fluid volume to the actuator target arbitrator module; and
an output loss module configured to receive the brake pad temperature signal to calculate and deliver output adjusted actuator target data to the actuator target arbitrator module, wherein the actuator target arbitrator module processes the volume adjusted actuator target data and the output adjusted actuator target data to calculate the actuator target command, wherein the actuator target arbitrator module, the compliance module, and the output loss module are configured to be executed by one or more processors and retrievably stored in one or more non-transitory storage mediums.

15. The computer program product set forth in claim 14, wherein the compliance module includes a displacement error routine to calculate volume error data at least indicative of an additional volume of hydraulic fluid needed to compensate for a loss in hydraulic fluid pressure, a displacement trend routine to receive the volume error data for compilation and establishing long-term volume error data, a displacement threshold routine to calculate displacement error threshold data based on brake temperature data, an intervention level routine to receive the long-term volume error data and the displacement error threshold data to calculate displacement error offset data, and a displacement adjusted actuator target routine to receive the displacement error offset data and calculate the displacement adjusted actuator target data.

16. The computer program product set forth in claim 15, wherein the output loss module includes an output error routine to calculate output error data, a long-term output trend routine configured to receive the output error data for compilation and establishing long-term output error data, an output threshold routine to calculate output error threshold data based on the brake pad temperature signal, an output intervention level routine to receive the long-term output error data and the output error threshold data to calculate output error offset data, and an output adjusted actuator target routine to receive the output error offset data and calculate the output adjusted actuator target data.

17. The computer program product set forth in claim 14, wherein the displacement adjusted actuator target data is based on at least long-term displacement error data and the brake pad temperature signal, and the output adjusted actuator target data is based on long-term output error data and the brake pad temperature signal.

18. The computer program product set forth in claim 14, wherein the compliance module is configured to receive one or more of a brake pedal position signal, an actuator position signal, an actuator apply rate of speed signal, a vehicle deceleration rate of speed signal, and a hydraulic fluid pressure signal to calculate the volume adjusted actuator target data, and wherein the output loss module is configured to receive one or more of the brake pedal position signal, the actuator position signal, the actuator apply rate of speed signal, the vehicle deceleration rate of speed signal, and the hydraulic fluid pressure signal to calculate the output adjusted actuator target data.

\* \* \* \* \*